(12) United States Patent
Kashiwabara

(10) Patent No.: US 8,235,020 B2
(45) Date of Patent: Aug. 7, 2012

(54) ENGINE STARTER MOUNTING STRUCTURE

(75) Inventor: Shigetoshi Kashiwabara, Kawasaki (JP)

(73) Assignee: Nissan Motor Co., Ltd., Yokohama (JP)

( * ) Notice: Subject to any disclaimer, the term of this patent is extended or adjusted under 35 U.S.C. 154(b) by 800 days.

(21) Appl. No.: 12/443,668

(22) PCT Filed: Jan. 28, 2008

(86) PCT No.: PCT/IB2008/000186
§ 371 (c)(1),
(2), (4) Date: Mar. 30, 2009

(87) PCT Pub. No.: WO2008/096217
PCT Pub. Date: Aug. 14, 2008

(65) Prior Publication Data
US 2010/0024757 A1    Feb. 4, 2010

(30) Foreign Application Priority Data

Feb. 5, 2007 (JP) ................................ 2007-025062
Dec. 26, 2007 (JP) ................................ 2007-334614

(51) Int. Cl.
*F02N 11/00* (2006.01)
*F02N 15/02* (2006.01)
*F02B 75/22* (2006.01)
*F02F 1/10* (2006.01)
*F02F 7/00* (2006.01)

(52) U.S. Cl. ............. 123/179.25; 123/179.1; 123/195 R

(58) Field of Classification Search ............. 123/179.25, 123/195 A, 195 C, 195 R, 179.1, 198 E, 198 R; 74/6, 7 B
See application file for complete search history.

(56) References Cited

U.S. PATENT DOCUMENTS

| | | | |
|---|---|---|---|
| 4,022,164 A * | 5/1977 | Fuchs | 123/339.14 |
| 5,207,195 A * | 5/1993 | McClintic | 123/179.25 |
| 7,594,490 B2 * | 9/2009 | Ono | 123/179.24 |
| 7,886,706 B2 * | 2/2011 | Grybush | 123/179.24 |
| 2004/0261742 A1 * | 12/2004 | Matsumoto et al. | 123/179.25 |
| 2007/0266982 A1 * | 11/2007 | Oga et al. | 123/179.25 |
| 2008/0066707 A1 * | 3/2008 | Berger | 123/179.25 |
| 2010/0089354 A1 * | 4/2010 | Wanner et al. | 123/179.25 |
| 2011/0088649 A1 * | 4/2011 | Minneker, Jr. | 123/179.25 |

FOREIGN PATENT DOCUMENTS

| | | |
|---|---|---|
| JP | H06-346754 A | 12/1994 |
| JP | H08-42432 A | 2/1996 |
| JP | H08-270533 A | 10/1996 |

* cited by examiner

*Primary Examiner* — Stephen K Cronin
*Assistant Examiner* — Sizo Vilakazi
(74) *Attorney, Agent, or Firm* — Global IP Counselors, LLP

(57) ABSTRACT

An engine starter mounting structure is provided that basically has a starter housing part, a starter insertion part, a first flange part and a second flange part. The starter housing part has an internal portion that at least partially houses a portion of a starter. The starter insertion part is arranged to provide access to the internal portion of the starter housing part for inserting the portion of the starter into the internal portion. The first flange part is disposed on an end portion of the starter housing part with the first flange part including a fastening structure that is configured to fasten the starter thereto. The second flange part is disposed in the internal portion of the starter housing part, with the second flange part having a bolt hole that is arranged and configured to receive a bolt therethrough for interconnecting an engine and a transmission together.

10 Claims, 7 Drawing Sheets

ENGINE STARTER MOUNTING STRUCTURE

CROSS-REFERENCE TO RELATED APPLICATIONS

This U.S. National stage application claims priority to Japanese Patent Application Nos. 2007-025062, filed on Feb. 5, 2007 and 2007-334614, filed on Dec. 26, 2007. The entire disclosures of Japanese Patent Application Nos. 2007-025062 and 2007-334614 are hereby incorporated herein by reference.

BACKGROUND OF THE INVENTION

1. Field of the Invention

The present invention generally relates to the mounting structures for starters that are used to start engines. More specifically, the present invention relates to an engine starter mounting structure that is mounted in a compact manner.

2. Background Information

Many gasoline internal combustion engines for vehicles are provided with a starter for starting an engine. For example, the starter is typically provided on a side of a transmission in a position that is offset in a circumferential direction of the transmission from a bolt flange into which a docking bolt is installed in order to fasten the engine and the transmission together. The starter is offset in order to prevent the starter from obstructing a space within which the work of installing and tightening the docking bolt is performed. One example of such a starter arrangement is disclosed in Japanese Laid-Open Patent Publication No. 2000-314467.

There are cases in which the starter and the bolt flange need to be arranged at the same position in the circumferential direction of the transmission due to, for example, restrictions of the space where the starter is installed in the engine compartment of a vehicle. In such a case, a working space for installing the docking bolt can be secured by arranging the starter to the outside of the bolt flange in the radial direction of the transmission.

In view of the above, it will be apparent to those skilled in the art from this disclosure that there exists a need for an improved engine starter mounting structure. This invention addresses this need in the art as well as other needs, which will become apparent to those skilled in the art from this disclosure.

SUMMARY OF THE INVENTION

It has been discovered that with the technology described above, the starter is positioned far to the outside in the radial direction of the transmission. Consequently, there is the problem of the radial dimension becoming large.

The present invention was conceived in view of the problem just described. One object is to provide a starter mounting structure that avoids increasing the radial dimension so that a more compact size can be achieved.

In order to achieve the aforementioned object, an engine starter mounting structure is provided that basically comprises a starter housing part, a starter insertion part, a first flange part and a second flange part. The starter housing part has an internal portion that is configured to at least partially houses a portion of a starter. The starter insertion part has a starter insertion opening that is arranged to provide access to the internal portion of the starter housing part for inserting the portion of the starter into the internal portion. The first flange part is disposed on an end portion of the starter housing part with the first flange part including a fastening structure that is configured to fasten the starter thereto. The second flange part is disposed in the internal portion of the starter housing part, with the second flange part having a bolt hole that is arranged and configured to receive a bolt therethrough for interconnecting an engine and a transmission together.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
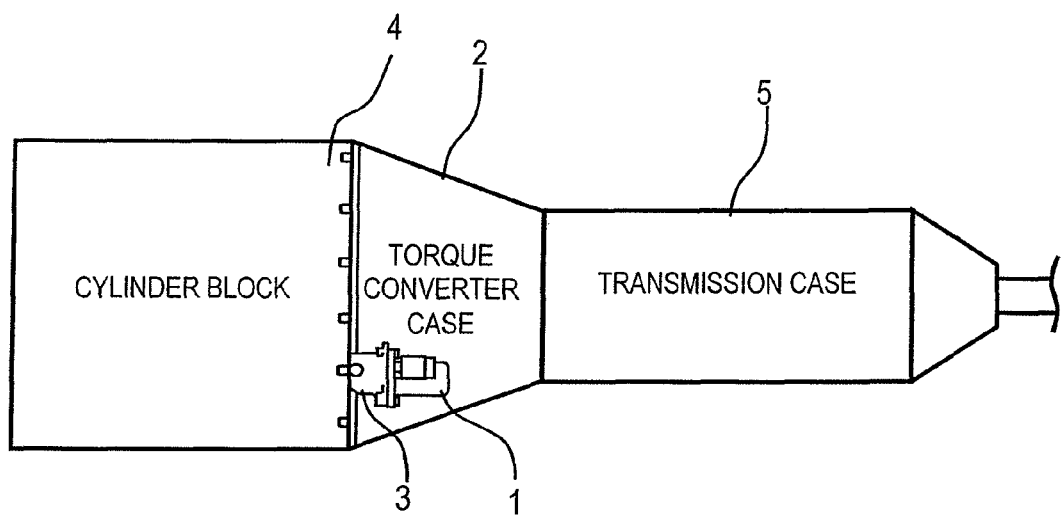
FIG. 1 is a schematic system diagram of a vehicle drive train with a starter mounting structure in accordance with one embodiment.
Figure 2:
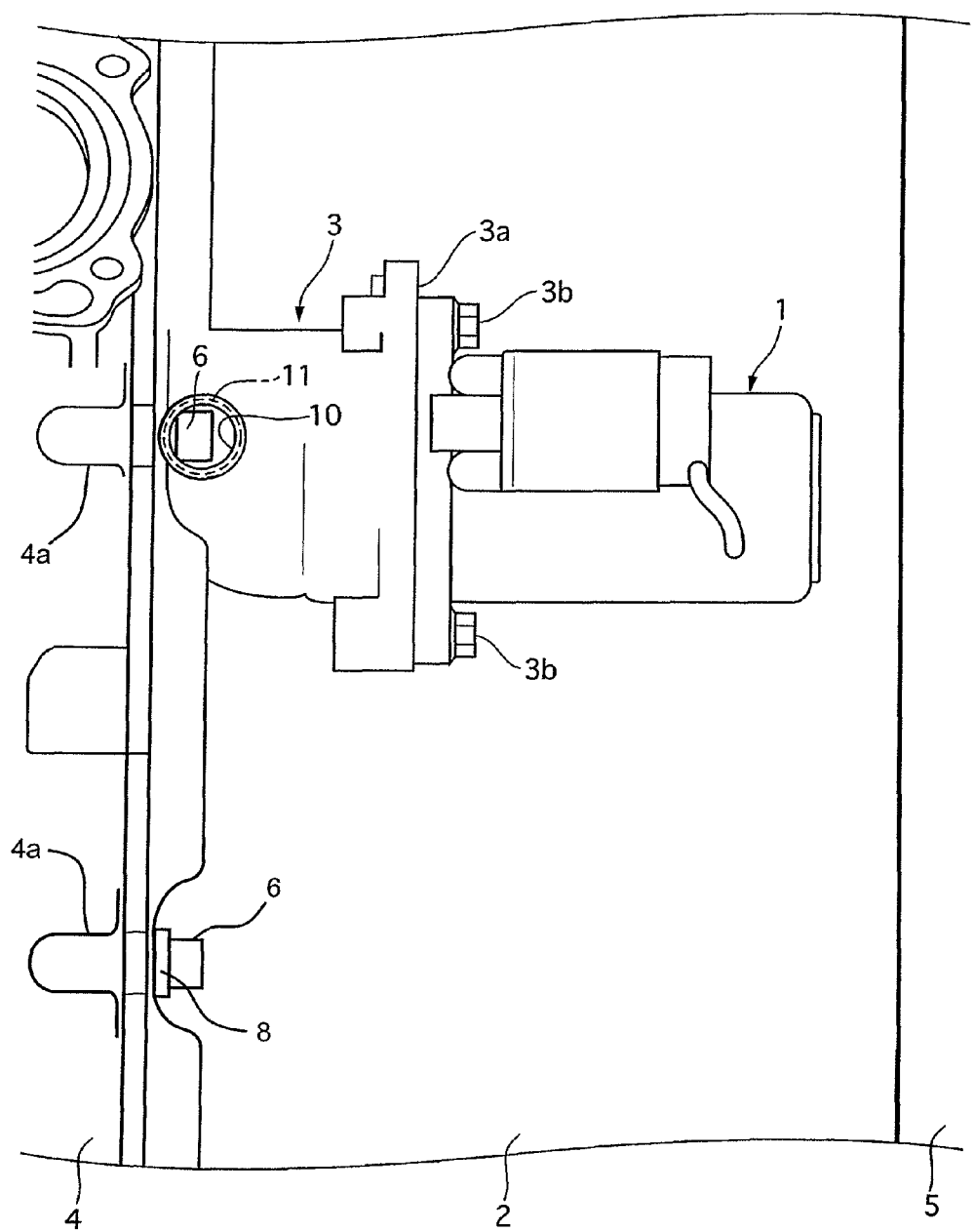
FIG. 2 is a side elevational view of a starter mounting structure and selected components of an automatic transmission that employs the starter mounting structure in accordance with one embodiment.

Referring initially to FIGS. 1 and 2, a starter 1 is illustrated that is mounted to a torque converter housing 2 via a starter mounting bracket 3 in accordance with one embodiment of the present invention. The torque converter housing 2 is coupled inbetween a cylinder block 4 of an internal combustion engine (FIG. 1) and a transmission case 5 of a transmission (FIG. 1). The torque converter housing 2 is fastened to the cylinder block 4 with a plurality of docking bolts 6 (only one shown). The torque converter housing 2 is either a unitary part of the transmission case 5 or a separate element that is fastened to the transmission case 5. In both cases, the torque converter housing 2 and the transmission case 5 are considered part of the transmission. The torque converter housing 2 is fastened to the cylinder block 4 with a plurality of docking bolts 6 (only one shown). In other words, the docking bolts 6 interconnecting the engine and the transmission together. In this illustrated embodiment, the torque converter housing 2 of the transmission has a plurality of bolt flanges 8, while the cylinder block 4 has a plurality of bolt bosses 4a. The bolt bosses 4a form a first bolt mounting part, while the bolt flanges 8 form a second bolt mounting part. The bolt bosses 4a have threaded bores for threadedly receiving the docking bolts 6. Each of the bolt flanges 8 has a seat surface 8a on one side facing the starter insertion part 9 for engaging the bolt head of the docking bolt 6 to sit against. Each of the bolt flanges 8 also has a bolt hole 8b for receiving the shaft of the docking bolt 6 therethrough.

In this illustrated embodiment, the starter mounting bracket 3 is provided on a side wall of the torque converter housing 2 of the transmission. The starter 1 is preferably fastened to a flange 3a of the starter mounting bracket 3 by a pair of bolts 3b as seen in FIG. 2. One of the bolt flanges 8 is formed as an integral part of the starter mounting bracket 3 and is arranged on the inside of the starter mounting bracket 3.

Figure 3:
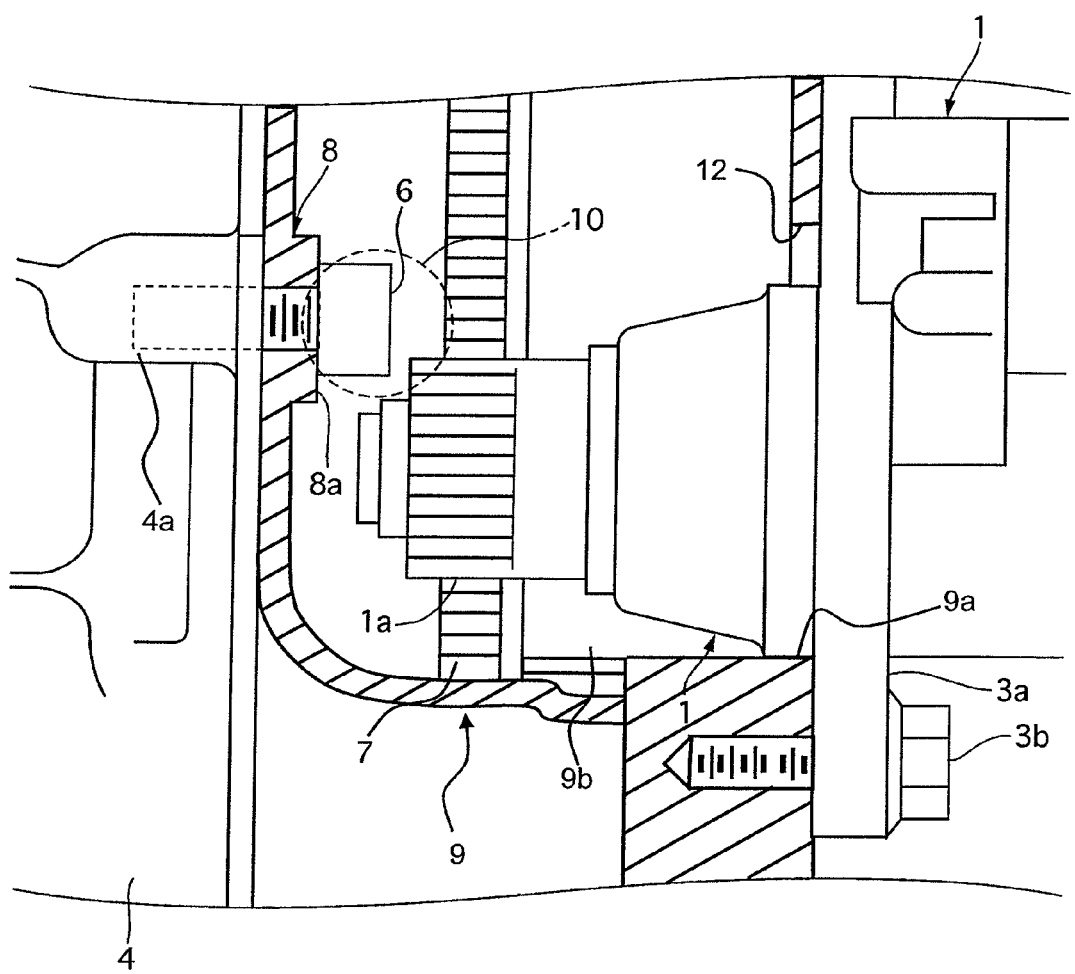
FIG. 3 is a side elevational view of the main components an inside portion of a starter mounting bracket and selected components of the automatic transmission.

As seen in FIG. 3, the starter 1 has a pinion gear 1a that is configured and arranged to move toward the cylinder block 4 when a starter switch is turned on so as to engage with a ring gear 7 that is arranged inside the torque converter housing 2 and coupled to a crankshaft (not shown) of the cylinder block 4. In this way, the motor torque of the starter 1 is transferred to the crankshaft and the engine is started. The ring gear 7 is arranged around an outer circumference of a torque converter or drive plate that is coupled to an end portion of the crank shaft.

Figure 4:
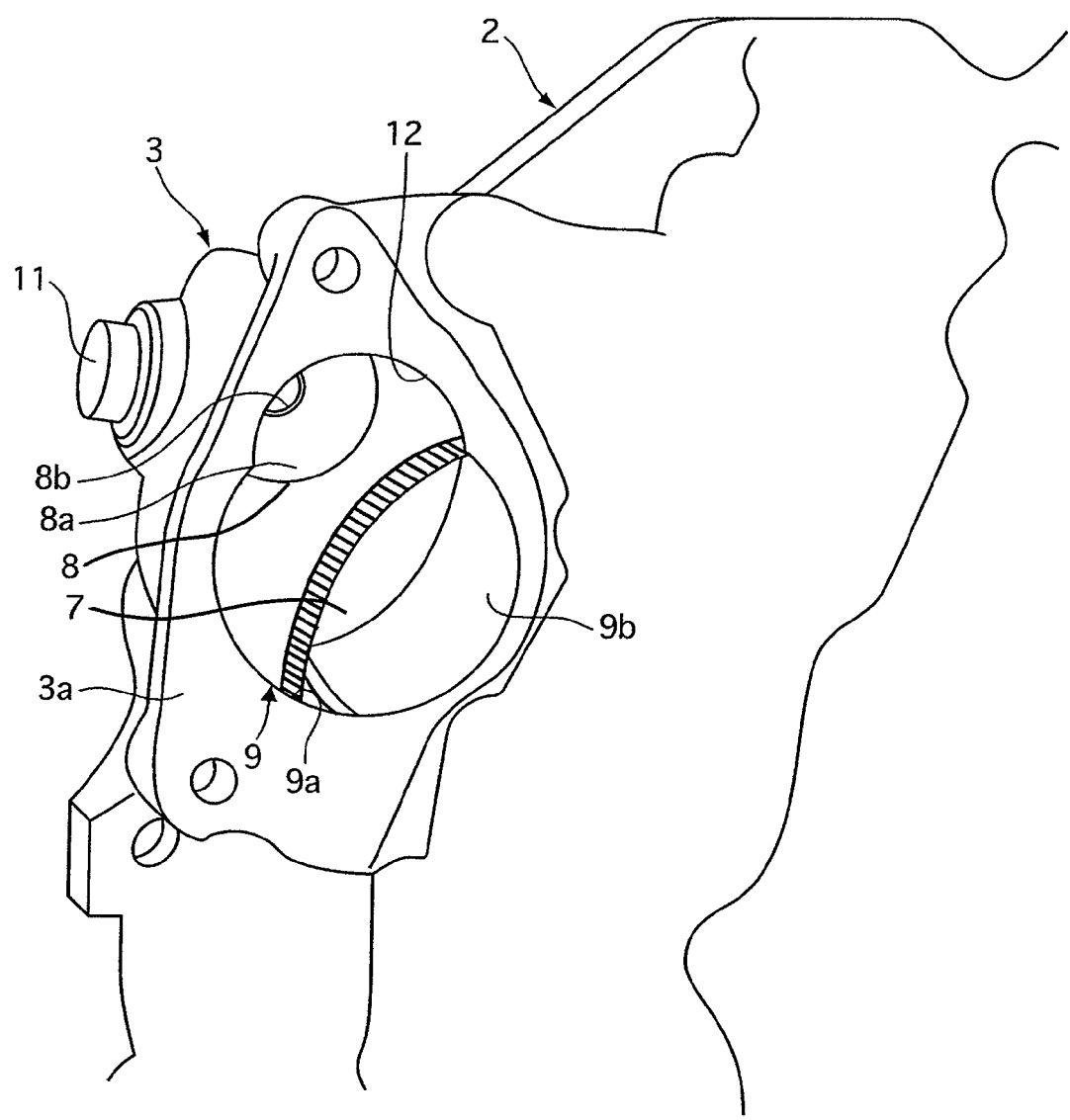
FIG. 4 is a perspective view of the starter mounting bracket that illustrates a starter insertion part of the starter mounting bracket.
Figure 5:
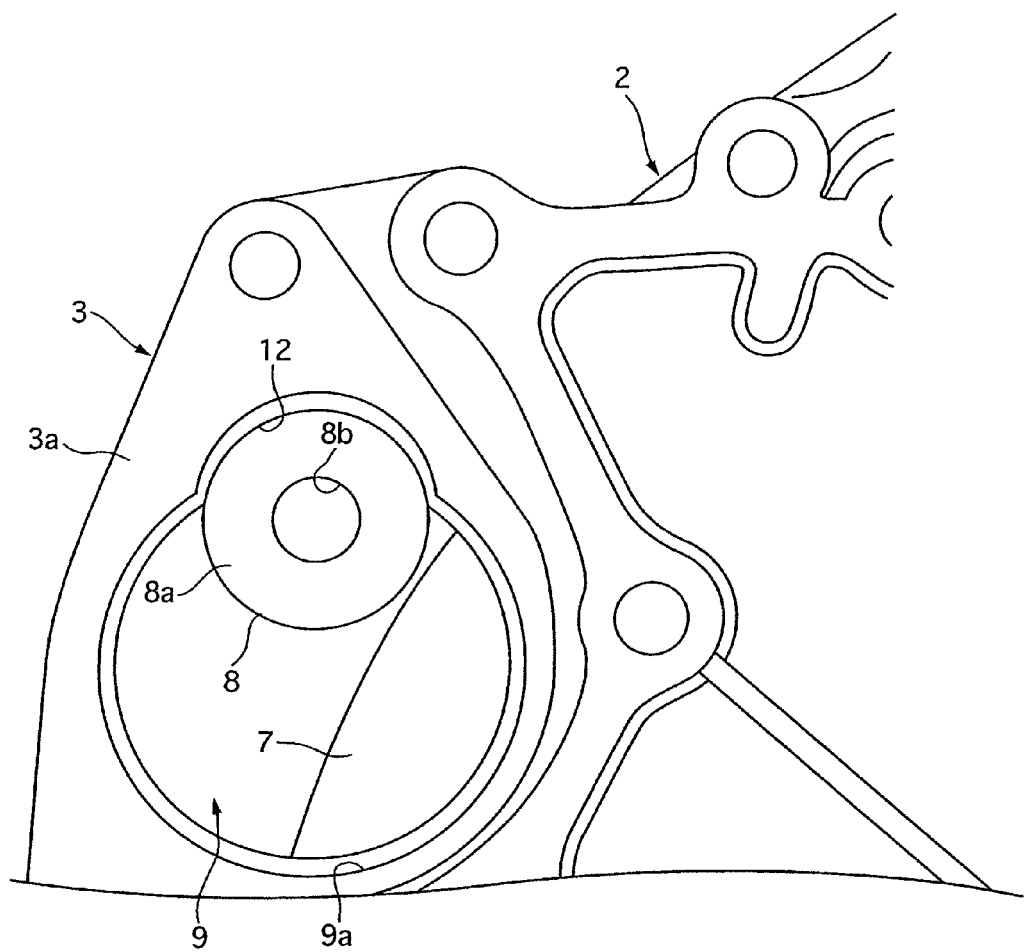
FIG. 5 is an enlarged, partial rear elevational view of the starter insertion portion.

The main features of the starter mounting bracket 3 of the illustrated embodiment will now be explained using FIGS. 3 and 4 in addition to FIGS. 1 and 2. FIG. 4 is a perspective view of the starter mounting bracket 3 in accordance with the illustrated embodiment showing a starter insertion part 9 of the starter mounting bracket 3. FIG. 5 is a rear view showing the starter insertion part 9 of the starter mounting bracket 3 of the illustrated embodiment.

The starter mounting bracket 3 of the illustrated embodiment is arranged to be offset in the axial direction of the transmission from a bolt flange 8 of the torque converter housing 2 so that the starter mounting bracket 3 is closer to the transmission case 5 than the bolt flange 8. The starter mounting bracket 3 is configured to bulge outward in the radial direction of the transmission from a portion of the side wall of the torque converter housing 2. The starter insertion part 9 is configured for the starter 1 to be inserted therein along the axial direction of the transmission from the side of the torque converter housing 2 toward the cylinder block 4 such that the starter 1 fits snugly in the starter insertion part 9 without play therebetween.

In the starter mounting structure in accordance with the illustrated embodiment, the starter mounting bracket 3 is part of the torque converter housing 2 and defines a starter housing part having an internal portion that at least partially houses a portion of the starter 1. The starter mounting bracket 3 has the flange 3a constituting a first flange part onto which the starter 1 is fastened and the bolt flange 8 constituting a second flange part having the bolt hole 8b configured to receive one of the docking bolts 6 for connecting the engine and the transmission. The flange 3a (first flange part) is provided on an end portion of the starter mounting bracket 3 (the starter housing part), while the bolt flange 8 (second flange part) is provided inside the internal portion of the starter mounting bracket 3 (the starter housing part). The flange 3a (first flange part) includes a threaded hole (e.g., a fastening structure) that is configured to fasten the starter 1 thereto. Consequently, the bolt flange 8 (second flange part) and the starter 1 can be arranged to be offset from each other in the axial direction of the transmission and in substantially the same position in the radial direction of the transmission. Thus, the overall radial dimension of the drive train at the starter 1 can be suppressed. As a result, an increase in the radial dimension can be avoided and the structure can be made more compact.

The starter insertion part 9 has a starter insertion part or opening 9a with a substantially cylindrical shape that is configured to follow the contour of the external circumference of the starter 1. The starter insertion part or opening 9a of the starter insertion part 9 is arranged to provide access to the internal portion of the starter mounting bracket 3 (i.e., the starter housing part) for inserting the portion of the starter 1 into the internal portion. The starter insertion opening 9a of the starter insertion part 9 is aligned with the bolt flange 8. The starter insertion opening 9a of the starter insertion part 9 is dimensioned such that the docking bolt 6 and a bolt installation tool can be inserted into the starter insertion opening 9a for installing the docking bolt 6 into the bolt hole 8b of the bolt flange 8 from the starter insertion opening 9a of the starter insertion part 9. As shown in FIG. 5, in the illustrated embodiment, the center position of the bolt hole 8b is divergent (offset) from the center position of the starter insertion part 9 in the vertical direction of the transmission when viewed from the axial direction of the transmission.

The starter insertion part 9 has a generally circular arc-shaped housing reinforcing rib (receiving member) 9b provided in the opening portion that communicates with the inside of the torque converter housing 2. The housing reinforcing rib 9b is arranged so as not to interfere with the starter 1 and the ring gear 7. The housing reinforcing rib 9b increases the rigidity of the torque converter housing 2 and restricts possibility of the docking bolt 6 falling into the inside of the torque converter housing 2. In the illustrated embodiment, the housing reinforcing rib 9b follows the contour of the starter insertion opening 9a as seen in FIG. 3.

The starter mounting bracket 3 is provided with a confirmation opening 10 for visually checking if the docking bolt 6 is seated properly against the seat surface 8a. The confirmation opening 10 is provided on a side wall of the starter mounting bracket 3 in a position corresponding to the bolt flange 8 in the axial direction of the transmission. The confirmation opening 10 is covered with a lid member 11 after the seating of the docking bolt 6 has been checked.

A notch 12 is provided in an inner edge of the starter insertion opening 9a of the starter insertion part 9 at a position that is shifted toward a center of the bolt hole 8b. The notch 12 has a "notch angle" that is defined to be the angle formed by two straight lines joining the center of the starter insertion opening 9a of the starter insertion part 9 with intersection points where the notch 12 intersects with the outer circumference of the starter insertion opening 9a of the starter insertion part 9. The notch angle is set to an angle that is equal to a maximum allowable value at which an amount of center position misalignment of the starter 1 resulting from the notch 12 does not affect the performance of the starter 1 (e.g., engagement of the pinion gear 1a with the ring gear 7).

Figure 6A:
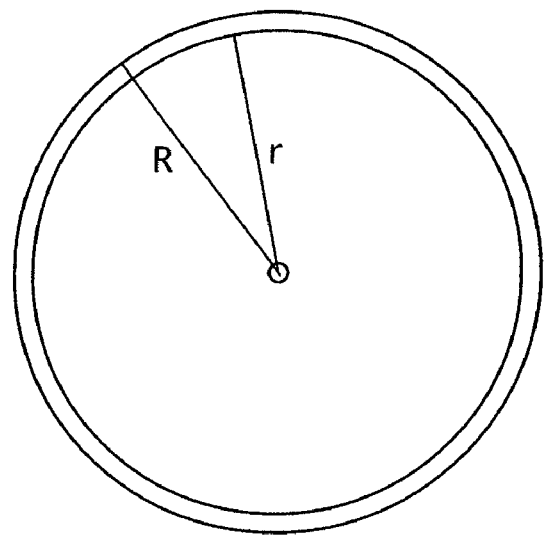
FIG. 6A is a first diagram illustrating the relationship between the starter insertion part and the notch.
Figure 6B:
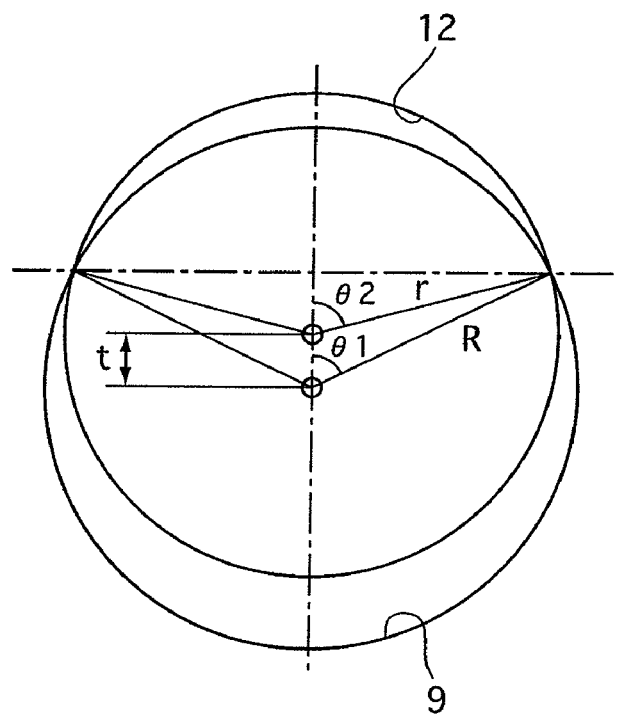
FIG. 6B is a second diagram illustrating the relationship between the starter insertion part and the notch.

More specifically, the following relationships hold in FIG. 6:

$$R \sin \theta_1 = r \sin \theta_2 \tag{1}$$

$$R \cos \theta_1 = r \cos \theta_2 + t \tag{2}$$

where

R: maximum diameter of the starter insertion opening 9a of the starter insertion part 9;

r: minimum diameter of a portion of the starter 1 located in the starter insertion opening 9a;

t: maximum allowable value of amount of center position divergence between the starter insertion part 9 and the notch 12;

θ1: notch angle (0≦θ1≦π/2); and

θ2: angle of two straight lines (0≦θ2≦π/2) joining the center of the notch 12 to intersection points where the starter insertion opening 9a of the starter insertion part 9 and the notch 12 intersect.

The following equations can also be written based on the equations (1) and (2).

$$\cos \theta 1 = (R^2 - r^2 + t^2)/2Rt \quad (3)$$

$$\theta 1 = \cos^{-1}\{(R^2 - r^2 + t^2)/2Rt\} \quad (4)$$

In short, in the illustrated embodiment, the notch angle θ1 is set such that it satisfies the equation (4) in order to avoid the notch 12 from adversely affecting performance of the starter 1. In other words, the diameter R of the starter insertion opening 9a of the starter insertion part 9 is set at the maximum allowable value (tolerance value), while the diameter r of the starter 1 is set at the minimum allowable value (tolerance value). At this time, even when the center position of the starter 1 has the maximum misalignment with respect to the starter insertion opening 9a of the starter insertion part 9, the amount of misalignment is equal to the amount of maximum allowable level by the notch angle θ1. Thus, the misalignment of the center of the starter 1 cause by the notch 12 does not affect performance of the starter 1 when the engine starts. Thus sufficient engagement of the pinion gear 1a with the ring gear 7 is ensured by setting the notch angle θ1 to an angle that is equal to a maximum allowable value at which an amount of center position misalignment of the starter 1 resulting from the notch 12 does not affect the performance of the starter 1.

The method of fastening the cylinder block 4 and the torque converter housing 2 together and the method of mounting the starter 1 will now be explained. With the starter mounting structure of the illustrated embodiment, the cylinder block 4 and the torque converter housing 2 are fastened together with the docking bolts 6 before the starter 1 is mounted to the starter mounting bracket 3.

First, a worker aligns the positions of the bolt bosses 4a provided on the cylinder block 4 with the positions of the bolt flanges 8 provided on the torque converter housing 2. Next, the worker inserts a tool with the docking bolt 6 attached thereto through the starter insertion opening 9a of the starter insertion part 9 of the starter mounting bracket 3. The docking bolt 6 is then inserted into the bolt hole 8b of the bolt flange 8 located at the starter mounting bracket 3. Then, the worker fastens the cylinder block 4 and the torque converter housing 2 together with the docking bolt 6.

Since the starter insertion part 9 is provided with a notch 12 whose position is shifted toward the center of the bolt hole 8b, sufficient working space for installing the bolt 6 can be secured even though the position of the bolt hole 8b is divergent from the starter insertion part 9.

Additionally, since the starter insertion part 9 is provided with a housing reinforcing rib 9b that restricts the ability of the docking bolt 6 to fall inside the torque converter housing 2, a situation in which the docking bolt 6 falls inside the torque converter housing 2 during installation can be reliably prevented.

After the docking bolt 6 has been tightened, the worker fastens the starter 1 to the starter mounting bracket 3 with two bolts 3b. The worker then performs a post torque paint check and checks the seating of the docking bolt 6 through the confirmation opening 10. Lastly, the worker installs the lid member 11 into the confirmation opening 10.

In existing starter mounting structure, certain problems can arise. When an engine and a transmission are being newly assembled and the starter for starting the engine is to be installed on the transmission side, there are cases in which the working space for installing the docking bolt and the space for mounting the starter will interfere with each other. A known method to resolve this problem is to arrange the starter to the outside of the bolt flange in the radial direction of the transmission and install an idler gear between the starter and the ring gear so as to secure working space for installing the docking bolt. However, this approach causes the radial dimension to increase because the starter is arranged far to the outside in the radial direction of the transmission and causes the number of parts and the weight to increase because a separate idler gear is required.

Other methods include changing the angle at which the engine or transmission is installed in the vehicle, changing the position where the docking bolt installs into the engine, changing the position where the starter motor is installed on the transmission, changing the type and/or shape of the starter motor, and reevaluating the vehicle installation feasibility. Any of these methods involves a large cost increase due to the changing the design and/or shape and could involve a performance degradation due to changing the installation angle.

In the illustrated embodiment, the starter mounting structure shares space to enables a more compact structure. Thus, in contrast to the existing starter mounting structure, in the starter mounting structure in accordance with the illustrated embodiment, the starter 1 and the bolt flange 8 are offset from each other in the axial direction of the transmission. Consequently, the starter 1 and the bolt flange 8 can be arranged in the same position in the radial direction of the transmission and the radial dimension can be suppressed (prevented from increasing).

Here, the challenge is securing a working space for installing the docking bolt 6. The illustrated embodiment meets this challenge by enabling the starter insertion part 9 to be used as a working space for installing the docking bolt 6 before the starter 1 is mounted. In other words, the same space is shared as a space for mounting the starter 1 and as a working space for installing the docking bolts 6. In this way, interference between the mounting space of the starter 1 and the working space for installing the docking bolt 6 can be avoided.

Additionally, with a starting mounting structure in accordance with the illustrated embodiment in which the starter is mounted to the transmission, even if the working space for installing the docking bolt 6 and the mounting space for the starter 1 interfere with each other when the transmission and starter are newly assembled to the engine, it is not necessary to change the angle at which the engine or transmission is installed in the vehicle, change the position where the docking bolt installs into the engine, change the position where the starter motor is installed on the transmission, change the type and/or shape of the starter motor, or reevaluate the vehicle installation feasibility. Consequently, such problems as a large increase in cost or a degradation of performance resulting from changing an installation angle can be avoided.

In other words, when a transmission in accordance with the illustrated embodiment is combined with another engine, the compatibility can be resolved by merely changing the shape of the converter housing. Consequently, the combination can be accomplished while holding the cost to a minimum in comparison with, for example, changing the design of the cylinder block or transmission case, which are expensive and have complex structures.

With the illustrated embodiment, since the bolt flange 8 is formed integrally with the starter mounting bracket 3, the mounting rigidity with respect to the cylinder block 4 and the rigidity with which the starter is supported can be increased in comparison with a structure in which the bolt flange 8 and the starter 1 mounting bracket 3 are separate entities.

Also, in the illustrated embodiment 1, the confirmation opening 10 is provided in a side face of the starter mounting bracket 3 at a position corresponding to the bolt flange 8 in the axial direction of the transmission. The confirmation opening 10 enables a post torque paint check and a visual check of the seating state of the docking bolt 6 to be accomplished from the outside of the starter mounting bracket 3.

In the illustrated embodiment, the starting mounting structure maintains starter performance, while securing working space for bolt installation. In particular, in the illustrated embodiment, the bolt hole 8$b$ is divergent from the center of the starter insertion part 9 when viewed from an axial direction of the transmission. Therefore, a working space for installing the docking bolt 6 is secured by providing the notch 12 in the starter insertion part 9. The working space can be expanded by increasing the notch angle $\theta 1$ of the notch 12, but the larger the notch angle $\theta 1$ becomes, the more the centering of the starter 1 will become misaligned (the amount of intersection misalignment will increase). Therefore, it is necessary to keep the notch angle $\theta 1$ within a range where the original performance of the starter is not affected.

In the illustrated embodiment, the notch angle $\theta 1$ is set so satisfy the equation (4) such that the original performance of the starter 1 is not affected and a sufficient work space can be secured for installing the docking bolt 6.

The effects will now be explained. The following effects are obtained with a starter mounting structure in accordance with the illustrated embodiment.

(1) The starter mounting bracket 3 is arranged to be offset from one of a plurality of bolt flanges in an axial direction of the transmission and is provided with the starter insertion part 9 configured for the starter 1 to be inserted into. The starter insertion part 9 and the bolt hole 8$b$ of the bolt flange 8 associated with the starter mounting bracket 3 are offset and arranged to communicate with each other such that the docking bolt 6 can be inserted into the bolt hole 8$b$ from the starter insertion opening 9$a$ of the starter insertion part 9. As a result, even if there are restrictions of the space where the starter 1 is installed in the engine compartment of a vehicle, an increase in the radial dimension can be avoided and a more compact size can be achieved.

(2) Since the notch 12 whose position is shifted toward the center of the bolt hole 8$b$ is provided in an inner edge of the starter insertion opening 9$a$ of the starter insertion part 9, a sufficient working space for installing the bolt 6 can be secured even if the position of the bolt hole 8$b$ is divergent from the starter insertion opening 9$a$ of the starter insertion part 9. As a result, the work can be accomplished more efficiently.

(3) The notch 3 has a "notch angle" that is defined to be the angle $\theta 1$ formed by two straight lines joining the center of the starter insertion opening 9$a$ of the starter insertion part 9 with intersection points where the notch 12 intersects the starter insertion opening 9$a$ of the starter insertion part 9. The notch angle $\theta 1$ is set to an angle that is equal to or smaller than a maximum allowable value at which the amount of center position misalignment of the starter 1 resulting from the notch 12 does not affect the performance of the starter 1. As a result, a working space for installing the docking bolt 6 can be secured without degrading the original performance of the starter 1.

(4) Since the notch angle $\theta 1$ is set to satisfy the aforementioned equation (4) ($\theta 1 = \cos^{-1}\{(R^2 - r^2 + t^2)/2Rt\}$), the goal of securing a working space for installing the docking bolt 6 without degrading the original performance of the starter 1 can be accomplished even more reliably.

(5) Since the starter insertion part 9 is provided with a housing reinforcing rib 9$b$ that restricts the ability of the docking bolt 6 to fall inside the torque converter housing 2, a situation in which the docking bolt 6 falls inside the torque converter housing 2 during installation can be reliably prevented.

(6) Since the bolt flange 8 is formed integrally with the starter mounting bracket 3 and the seat surface 8$a$ for the docking bolt 6 is provided on the side of the starter insertion part 9 of the starter mounting bracket 3, the mounting rigidity with respect to the cylinder block 4 and the rigidity with which the starter 1 is supported can both be increased in comparison with a structure in which the bolt flange 8 and the starter mounting bracket 3 are separate entities.

(7) A confirmation opening 10 is provided in a side wall of the starter mounting bracket 3 at a position corresponding to the bolt flange 8. The confirmation opening 10 enables the bolt flange to be viewed and thereby enables a torque paint check and a bolt seating state check to be accomplished visually from the outside of the starter mounting bracket 3.

Although the illustrated embodiment presents a starter mounting structure in which the starter is mounted to an automatic transmission, the present invention can also be applied to a starter mounting structure in which the starter is mounted to an engine. Also, although the illustrated embodiment presents a starter mounting structure in which the starter is mounted to the converter housing 2 of the automatic transmission, the starter mounting structure can also be applied to a manual transmission in which the starter mounting bracket is mounted to a bell housing that houses a clutch of the transmission. Such a starter mounting structure can be used in combination with another engine by changing only the same of the bell housing. Although the illustrated embodiment presents an example in which the bracket is provided as an integral part of the converter housing 2 of the automatic transmission, the bracket can also be provided as a separate member that is fastened in place with bolts or some other securing means.

Figure 7:
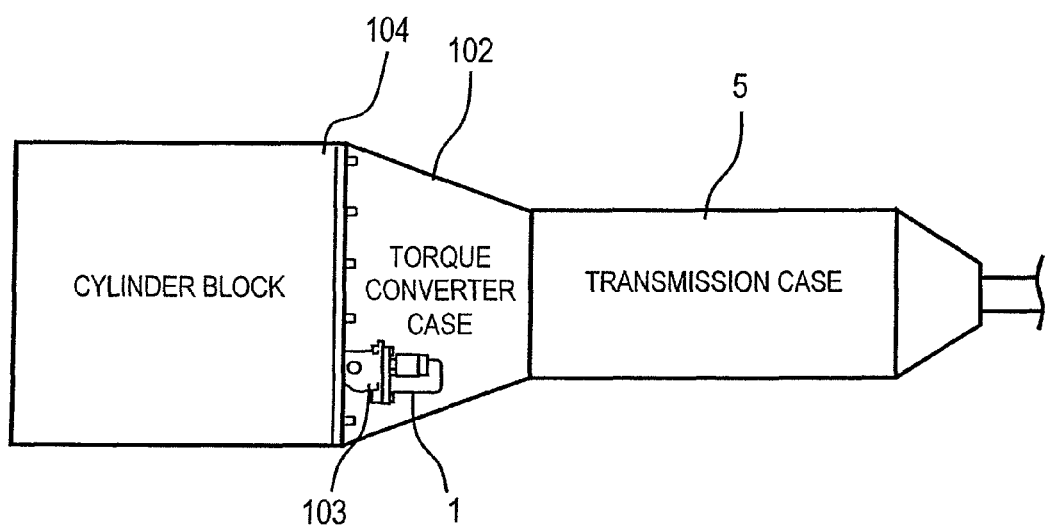
FIG. 7 is a schematic system diagram of a vehicle drive train with a starter mounting structure in accordance with another embodiment.

As seen in FIG. 7, the starter mounting structure can be formed as part of the engine. In particular, in FIG. 7, the starter 1 is mounted to a starter mounting bracket 103 that is formed as part of a cylinder block 104 in accordance with another embodiment. In this illustrated embodiment, a torque converter case 102 of the transmission is provided with a plurality of bolt bosses formed thereon, while the cylinder block 104 of the engine includes a plurality of bolt flanges formed thereon. One of the bolt flanges is integrally formed with the starter mounting bracket 103 in the same manner as the prior embodiment. Thus, the starter mounting bracket 103 is identical to the starter mounting bracket 3, as discussed above, except that the starter mounting bracket 103 that is formed as part of the cylinder block 104. In view of the similarities between the starter mounting bracket 3 and 103, the starter mounting bracket 103 will not be discussed and/illustrated in detail.

Although the illustrated embodiments present an example in which the notch is circular, the shape of the notch is not limited (i.e., the notch can have any shape). Furthermore, it is acceptable not to provide a notch at all in cases where the bolt hole for the docking bolt and the starter mounting position are arranged substantially on the same straight line and the bolt hole can be accessed with a tool easily through the starter insertion part.

Although, in the illustrated embodiments, the starter mounting bracket and the bolt flange are provided together as a single integral one-piece unit, it is acceptable for the starter mounting bracket and the bolt flange to be provided as separate members. It is also acceptable for the starter mounting bracket to be provided as a separate member from and the torque converter housing or the cylinder housings.

Although, in the illustrated embodiment, the starter 1 is inserted into the starter insertion part in a snugly fitting manner, it is not necessary for the starter 1 to fit snugly against the inside of the starter insertion part if the starter 1 is positioned by being fastened with bolts in a three-point arrangement. The same is true when the starter position is restricted using a dowel pin (knock pin).

In short, there are no particular limitations on the shapes of the starter mounting bracket and a bolt flange for installing the docking bolt 6 to fasten the engine and the transmission together so long as the starter mounting bracket is arranged to be offset in the axial direction of the transmission from the bolt flange and the inside of the starter insertion part and the bolt flange communicate with each other such that the docking bolt 6 can be inserted into the bolt hole formed in the bolt flange from the starter insertion part.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts, which can be a separate member or a one-piece, unitary member with another part. Moreover, terms that are expressed as "means-plus function" in the claims should include any structure that can be utilized to carry out the function of that part of the present invention. The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. An engine starter mounting structure comprising:
   a starter housing part having an internal portion that is configured to at least partially houses a portion of a starter;
   a starter insertion part with a starter insertion opening that is arranged to provide access to the internal portion of the starter housing part for inserting the portion of the starter into the internal portion;
   a first flange part disposed on an end portion of the starter housing part with the first flange part including a fastening structure that is configured to fasten the starter thereto; and
   a second flange part disposed in the internal portion of the starter housing part, with the second flange part having a bolt hole that is arranged and configured to receive a bolt therethrough for interconnecting an engine and a transmission together.

2. The starter mounting structure as recited in claim 1, further comprising
   a plurality of bolt bosses formed on one of the engine and the transmission; and
   a plurality of bolt flanges formed on one of the engine and the transmission that does not include the bolt bosses, with one of the bolt flanges forming the second flange part,
   the starter housing part being disposed on the one of the engine and the transmission that is provided with the bolt flanges,
   the first flange being axially offset from the second flange part in an axial direction of the transmission,
   the starter insertion opening of the starter insertion part and the bolt hole of the second flange part being aligned with each other such that a bolt for connecting the engine and the transmission together can be inserted into the bolt hole from through the starter insertion opening of the starter insertion part.

3. The starter mounting structure as recited in claim 2, wherein
   the starter insertion opening of the starter insertion part has an inner edge with a notch provided in the inner edge at a position that is shifted toward a center of the bolt hole.

4. The starter mounting structure as recited in claim 3, wherein
   the notch is disposed at a notch angle that is equal to or smaller than a maximum allowable value at which an amount of center position misalignment of the starter resulting from the notch does not affect a performance of the starter, the notch angle being defined to be an angle formed by two straight lines joining a center of the starter insertion part with intersection points of the notch with respect to the starter insertion opening of the starter insertion part.

5. The starter mounting structure as recited in claim 4, wherein
   the notch angle is set to satisfy the equation below:

$$\theta_1 = \cos^{-1}\{(R^2 - r^2 + t^2)/2Rt\}$$

where $\theta_1$ corresponds to the notch angle with $0 \leq \theta_1 \leq \pi/2$,
   R corresponds to a maximum diameter of the starter insertion opening,
   r corresponds to a minimum diameter a portion of the starter located in the starter insertion opening, and
   t corresponds to a maximum allowable value of the amount by which the center positions of the starter insertion and the notch are divergent from each other.

6. The starter mounting structure as recited in claim 2, wherein
the starter housing part has an inside with a receiving member configured to restrict the possibility of the bolt falling into an inside of the engine or an inside of the transmission.

7. The starter mounting structure as recited in claim 2, wherein
the second flange part is formed integrally with the starter housing part, and is provided with a bolt seat surface on a side facing the starter insertion part.

8. The starter mounting structure as recited in claim 7, wherein
the starter housing part includes a confirmation opening disposed at a position corresponding to the second flange part for visually checking the second flange part.

9. A mounting method for mounting a starter comprising:
providing a starter housing part on one of an engine and a transmission, with the starter housing part having an internal portion that is configured to at least partially houses a portion a starter, and a first flange part configured to fasten the starter thereto;
inserting a bolt is inserted into a bolt hole of a second flange provided inside the starter housing part;
securing an engine and a transmission together via the bolt; and
fastening the starter to the first flange with a portion of the starter being at least partially housed within the starter housing part.

10. An engine starter mounting structure comprising:
starter housing means for forming a housing with an internal portion that is configured to at least partially houses a portion a starter;
starter insertion means for accessing the internal portion of the starter housing means to insert the portion of the starter into the internal portion of the starter housing means;
first flange means for fastening the starter to the starter housing means; and
second flange means, disposed in the internal portion of the starter housing means, for receive a bolt therethrough for interconnecting an engine and a transmission together.

\* \* \* \* \*